US009001668B2

(12) United States Patent  
Gintis et al.

(10) Patent No.: US 9,001,668 B2
(45) Date of Patent: Apr. 7, 2015

(54) ENDPOINT SELECTION IN A NETWORK TEST SYSTEM

(71) Applicants: Noah Gintis, Westlake Village, CA (US); Razvan Stan, Agoura Hills, CA (US)

(72) Inventors: Noah Gintis, Westlake Village, CA (US); Razvan Stan, Agoura Hills, CA (US)

(73) Assignee: Ixia, Calabasas, CA (US)

( * ) Notice: Subject to any disclaimer, the term of this patent is extended or adjusted under 35 U.S.C. 154(b) by 174 days.

(21) Appl. No.: 13/668,090

(22) Filed: Nov. 2, 2012

(65) Prior Publication Data

US 2014/0126387 A1 May 8, 2014

(51) Int. Cl.
| | |
|---|---|
| *G06F 11/00* | (2006.01) |
| *G08C 15/00* | (2006.01) |
| *H04L 12/26* | (2006.01) |
| *H04L 12/24* | (2006.01) |

(52) U.S. Cl.
CPC ............... *H04L 43/045* (2013.01); *H04L 43/00* (2013.01); *H04L 43/04* (2013.01); *H04L 41/22* (2013.01); *H04L 43/50* (2013.01)

(58) Field of Classification Search
CPC ......... H04L 41/22; H04L 43/00; H04L 43/04; H04L 43/045
USPC .................................................. 370/241, 248
See application file for complete search history.

(56) References Cited

U.S. PATENT DOCUMENTS

| | | | | |
|---|---|---|---|---|
| 5,845,277 | A * | 12/1998 | Pfeil et al. ............................ 1/1 |
| 5,883,881 | A * | 3/1999 | Croslin ......................... 370/221 |
| 5,917,831 | A * | 6/1999 | Katker et al. ................. 714/712 |
| 6,310,883 | B1 * | 10/2001 | Mann et al. .................... 370/408 |
| 7,640,476 | B2 * | 12/2009 | Watkins et al. ............... 714/738 |
| 7,733,783 | B2 * | 6/2010 | Fitzgerald .................. 370/236.2 |
| 2001/0053129 | A1 * | 12/2001 | Arsikere et al. ............. 370/250 |
| 2003/0217294 | A1 * | 11/2003 | Kyle ............................ 713/202 |
| 2007/0220392 | A1 * | 9/2007 | Bhaumik et al. ............. 714/742 |
| 2007/0245198 | A1 * | 10/2007 | Betawar et al. .............. 714/742 |
| 2008/0092004 | A1 * | 4/2008 | Watkins et al. ............... 714/738 |
| 2008/0270529 | A1 * | 10/2008 | Cavagna et al. ............. 709/203 |
| 2011/0261705 | A1 * | 10/2011 | Kamerkar et al. ........... 370/252 |
| 2013/0144557 | A1 * | 6/2013 | Montfort et al. ............. 702/185 |
| 2014/0071822 | A1 * | 3/2014 | Rochon ..................... 370/230.1 |

* cited by examiner

*Primary Examiner* — Farah Faroul

(74) *Attorney, Agent, or Firm* — SoCal IP Law Group LLP; John E. Gunther; Steven C. Sereboff

(57) ABSTRACT

A method for testing a network and a test manager for a network test system are disclosed. The method for testing a network may including displaying (1) a graphical user interface including a graphical representation of endpoints available for selection as endpoints of traffic to be generated during a test session and (2) a tabular list describing selected endpoints. Source endpoints for the traffic may be selected and the selected source endpoints may be designated on the graphical representation of endpoints and described in the tabular list. Traffic from the selected source endpoints to the selected destination endpoints may be generated for transmission via the network.

25 Claims, 10 Drawing Sheets

ENDPOINT SELECTION IN A NETWORK TEST SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to defining test configurations and test methods for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1, or physical layer, protocols define the physical (electrical, optical, or wireless) media between nodes of the network and the rules and processes used to access that media. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7, or application layer, protocols include the Hyper-Text Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "network under test" (NUT) encompasses all or a portion of a packet switched communications network or one or more network devices within, or for use in, a packet switched communications network. In order to test a NUT, test traffic comprising a large number of packets may be generated and transmitted to and/or through the NUT at one or more ports. Return test traffic transmitted through and/or from the NUT may be received at different ports. The received test traffic may be analyzed to measure the performance of the NUT. In this context, the term "port" refers to a logical entity coupled to the NUT by a communications path. The term "port unit" refers to a module within the network test equipment that connects to the NUT at a port. Thus a "port" encompasses a physical "port unit" and the data and parameters that define and constraint the operation of the port unit during attest session. Each port connected to the NUT may be both a source of test traffic and a destination for test traffic. Each port may emulate a plurality of logical source or destination addresses. Each port may emulate a plurality of network users, clients, peers, servers, or other network devices.

The test traffic may depend on the type of network or device to be tested and the type of test to be performed. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant.

When the NUT operates at a higher layer of the network structure (for example, when the NUT is or includes a server, a server load balancer, a firewall, a network security device that performs packet inspection, or similar network devices), the test traffic may include or be a large plurality of TCP connections or a large plurality of application layer transactions (e.g. HTTP GET transactions).

The first step in testing a NUT is to generate a test configuration. In this patent, a "test configuration" is a data set that defines both a test system and a test procedure to be used to test the NUT. A test configuration may include, for example, data defining the number and types of port units that will be connected to the NUT, the attributes and capabilities of each port, the protocols to be executed by each port, the traffic to be generated by each port, and the test data to be acquired during the test.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
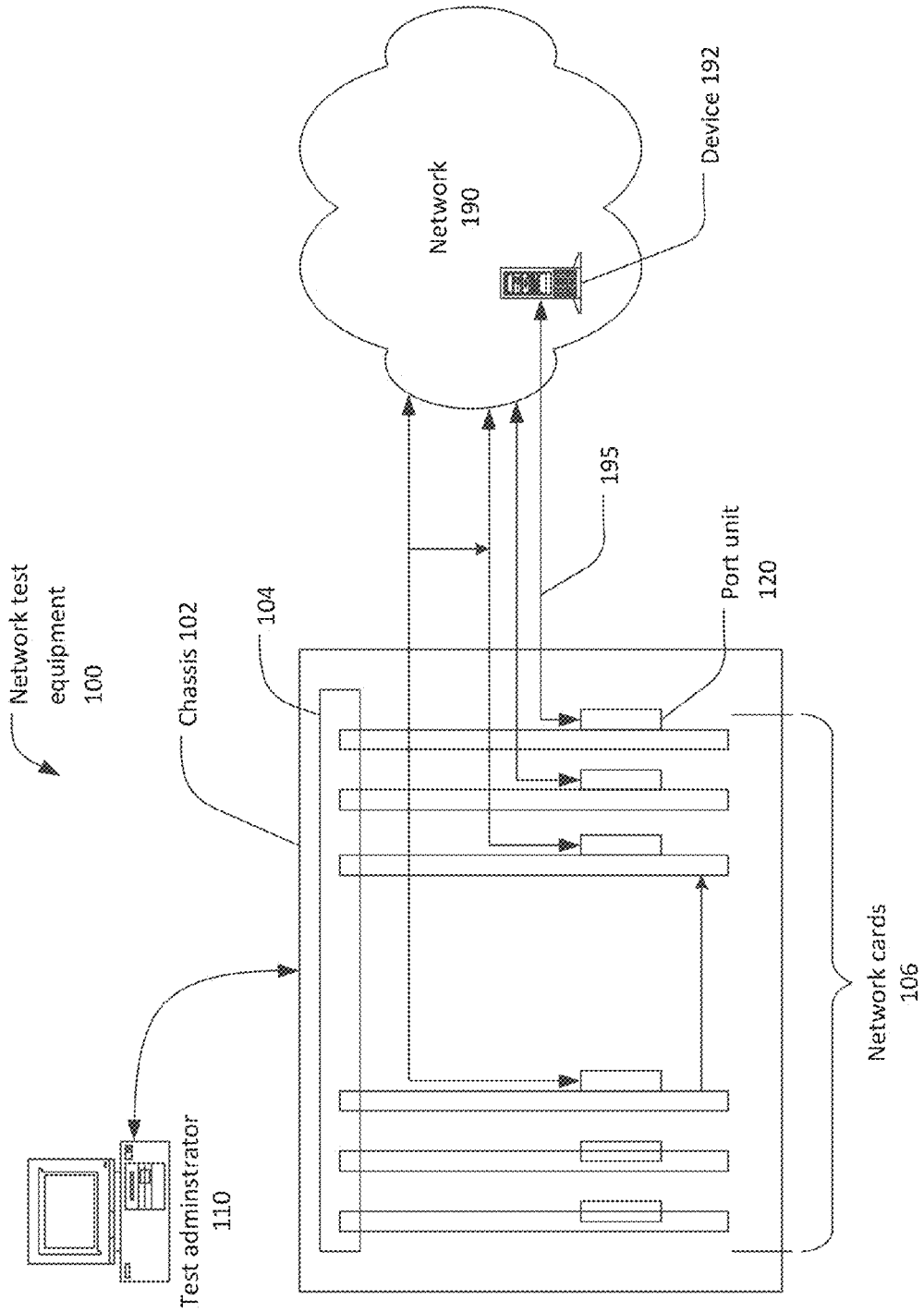
FIG. 1 is a block diagram of a network environment.

FIG. 1 shows a block diagram of a network environment. The environment may include network test equipment 100 and a network 190 which includes one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may support a single communications protocol, may support a number of related protocols, or may support a number of unrelated protocols. One or more network cards 106 or their equivalent may be permanently installed in a self-contained test unit or tests appliance.

Each network card 106 may contain one or more port unit 120. Each port unit 120 may include circuits and software to generate test traffic and/or to receive and analyze test traffic. Each port unit may be coupled to the test administrator 105. Each port unit 120 may connect to the network 190 through one or more ports. Each port unit 120 may be connected to the network 190 through a communication medium 195, which may be a wire, an optical fiber, a wireless link, or other communication medium.

The backplane 104 may serve as a bus or communications medium for the network cards 106. The backplane 104 may also provide power to the network cards 106.

The network test equipment 100 may also include a test administrator 110. The test administrator 110 may be a computing device included within or coupled to the chassis 102. The test administrator 110 may include an operator interface (not shown) that may be used to define a test configuration, to plan a test session, to control the test session, and/or to view test results during and after the test session. The operator interface may include, for example, a display and a keyboard, mouse, and/or other input devices (not shown). The test administrator 110 may include or be coupled to a printer or other data output device (not shown) for output of test results. The test administrator 110 may include or be coupled to a storage device (not shown) for storing test data and results for future review and/or analysis.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

The one or more network devices 192 may be any devices capable of communicating over the network 190. The one or more network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices 192 may include appliances, alarm systems, and any other device or system capable of communicating over a network. The network 190 may consist of a single network device 192 or a plurality of network devices interconnected by a plurality of communications paths, all of which will be referred to herein as the network under test (NUT).

Figure 2:
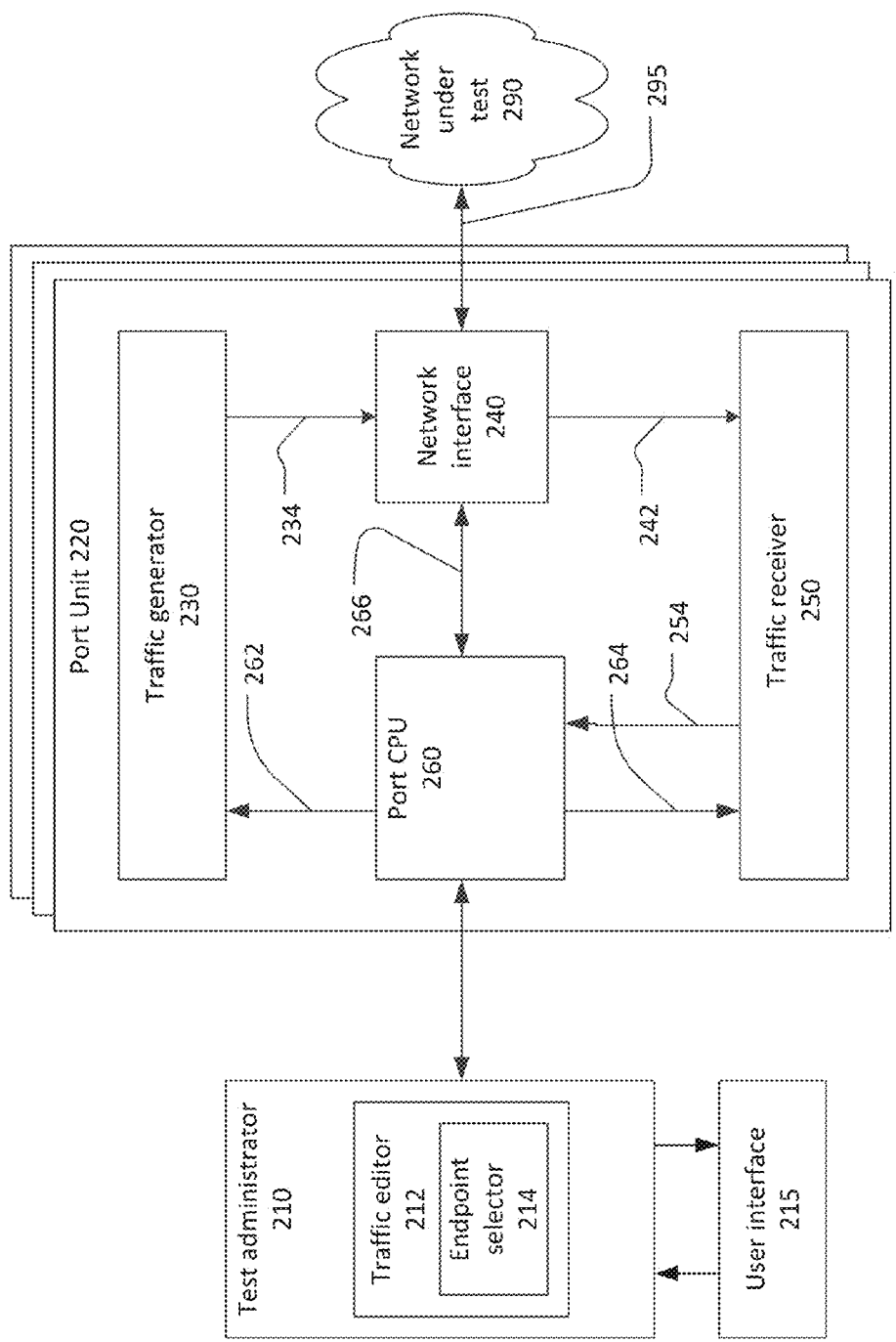
FIG. 2 is a block diagram of a test system.

Referring now to FIG. 2, a test system 200, which may be the network test equipment 100 may includes a test administrator 210 coupled to a plurality of port units including an exemplary port unit 220. The port unit 220 may include a port central processor unit 260 (CPU), a traffic generator unit 230, a traffic receiver unit 250, and a network interface unit 240 which couples the port unit 220 to a network under test 290. The port unit 220 may be all or part of a network card such as the network cards 106.

The port CPU 260 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 260 may provide the traffic generator unit 230 with stream forming data 262 to form a plurality of streams. The stream forming data 262 may include, for example, the type of packet, the frequency of transmission, definitions of fixed and variable-content fields within the packet and other information for each packet stream. The traffic generator unit 230 may then generate the plurality of streams in accordance with the stream forming data 262. The plurality of streams may be interleaved to form outgoing traffic 234. Each of the streams may include a sequence of packets. The packets within each stream may be of the same general type but may vary in length and content.

The network interface unit 240 may convert the outgoing traffic 234 from the traffic generator unit 230 into the electrical, optical, or wireless signal format required to transmit the test traffic to the network under test 290 via a link 295. The link 295 may be a wire, an optical fiber, a wireless link, or other communication link. Similarly, the network interface unit 240 may receive electrical, optical, or wireless signals from the network over the link 295 and may convert the received signals into incoming traffic 242 in a format usable to the traffic receiver unit 250.

The traffic receiver unit 250 may receive the incoming traffic 242 from the network interface unit 240. The traffic receiver unit 250 may determine if each received packet is a member of a specific flow, and may accumulate test statistics for each flow in accordance with test instructions 264 provided by the port CPU 260. The accumulated test statistics may include, for example, a total number of received packets, a number of packets received out-of-sequence, a number of received packets with errors, a maximum, average, and minimum propagation delay, and other statistics for each flow. The traffic receiver unit 250 may also capture and store specific packets in accordance with capture criteria included in the test instructions 264. The traffic receiver unit 250 may provide test statistics and/or captured packets 254 to the port CPU 260, in accordance with the test instructions 264, for additional analysis during, or subsequent to, the test session.

Some amount of interactive communications may be required between the port unit 220 and the network under test 290 during a test session. The interactive communications may include, for example, TCP connections and application-layer transactions. Such traffic may be initiated, managed, and processed by the port CPU 260 and thus may be referred to as "CPU traffic". As shown in FIG. 2, the port CPU 260 may be coupled to the network interface unit 240 such that CPU traffic 266 may be communicated between the port CPU 260 and the network under test 290 via the network interface unit 240. Although not shown in FIG. 2, outgoing CPU traffic may be routed from the Port CPU 260 to the network interface unit 240 via the traffic generator unit 230, and incoming CPU traffic may be routed from the network interface unit to the port CPU via the traffic receiver unit 250.

The port CPU 260 may communicate with the test administrator 210, which in turn may communicate with or include a user interface 215. The test administrator 210 may be a computing device connected to the port unit 220 via a bus, a network, or another communications path. The user interface 215 may include at least one display device and one or more input devices such as a keyboard, a mouse or other pointing device, and/or a touch screen.

The hardware and software of the test administrator 210 may perform multiple functions including a traffic editor 212 which may be used to define traffic as part of defining a test configuration. The traffic editor 212 may include an endpoint selector 214 used to select endpoints for the traffic to be generated during a network test session.

The test administrator 210 may provide the port CPU 260 of each port unit 220 with instructions, parameters, and data required for each port unit to participate in testing the network under test 290. The instructions and data provided by the test administrator to each port unit 220 may include, for example, data enabling or disabling various capabilities and protocols, operational parameters, definitions of packet streams to be generated by the port unit and definitions of performance statistics to be accumulated by the port unit. The instructions and data provided by the test administrator 210 to each port unit 220 may include instructions and data to cause the port units to generate test traffic as defined using the traffic editor 212.

Figure 3:
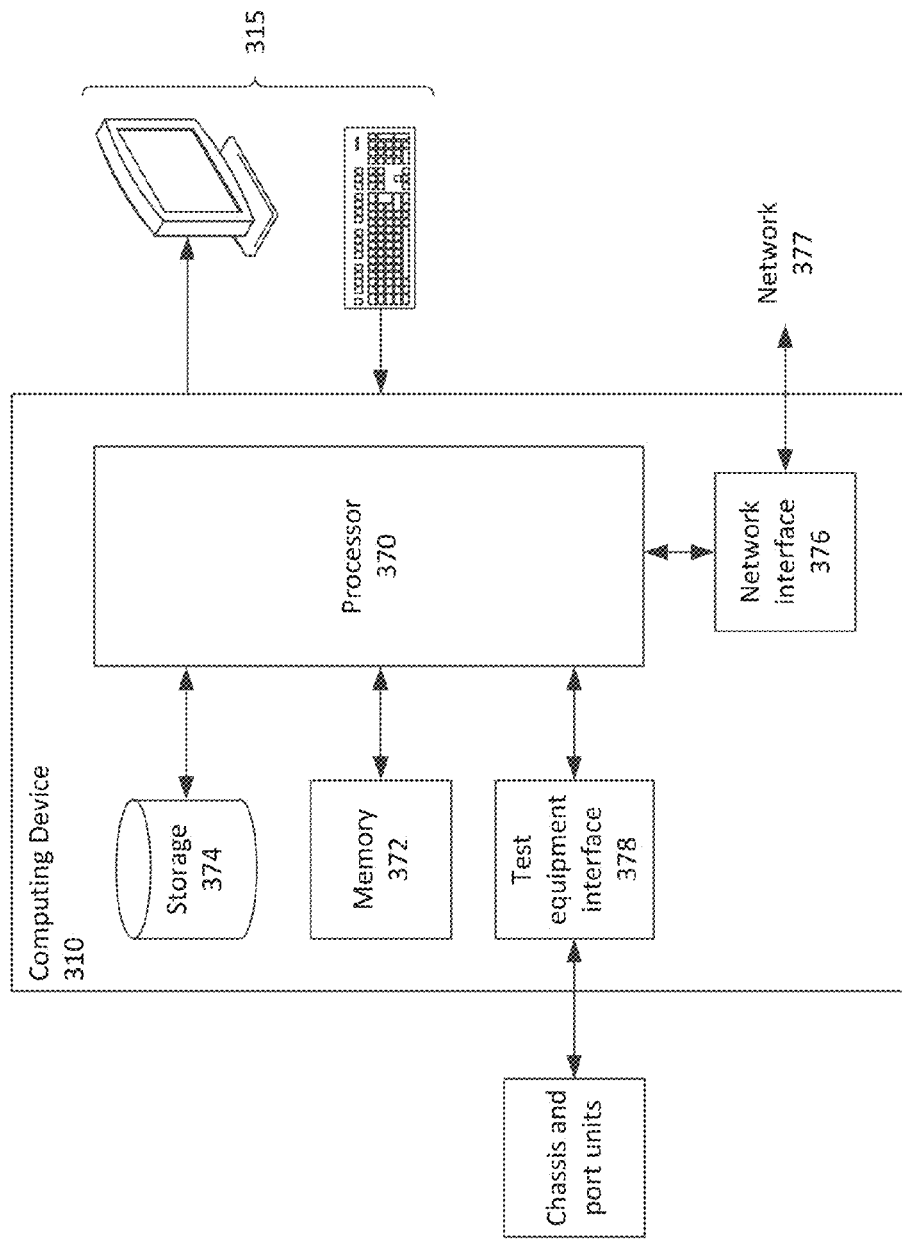
FIG. 3 is a block diagram of a computing device.

Referring now to FIG. 3, a computing device 310, which may be the test administrator 210, may include at least one processor 370 coupled to a memory 372. The processor 370 may be a single processor, multiple processors, or multiple processor cores within one or more processor circuit devices. The memory 372 may be static and/or dynamic random access memory or a combination of random access memory and other memory such as nonvolatile writable memory and read only memory. The memory 372 may temporarily or permanently store software instructions for execution by the processor 370 and data for use during the execution of those instructions.

The processor 370 may be coupled to a network 377, which may be or include the Internet, via a network interface 376. The processor 370 may be coupled to a user interface 315, which may includes a display and a keyboard and other devices that are not shown. The processor 370 may be configured to communicate with test equipment, such as the chassis 102 and network cards 106, via a test equipment interface 378. The test equipment interface 378 may be coupled to the chassis and port units via a bus, a network, and/or other communications paths which may be wired, fiber optic, or wireless.

The computing device 310 may execute an operating system, including, for example, variations of the Linux, Microsoft® Windows®, and Apple® Mac® operating systems. To access the Internet, the client computer may run a browser such as Microsoft® Explorer® or Mozilla® Firefox®, and an e-mail program such as Microsoft® Outlook® or Lotus Notes®. The computing device 310 may execute one or more application programs to perform the actions and methods described herein.

The operating system and/or application programs may be stored in the form of instructions on a machine readable storage medium within a storage device 374 coupled to the processor 370. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media. Within this patent, the term "storage medium" refers to a physical object capable of storing data. The term "storage medium" does not encompass transitory media, such as propagating signals or waveforms.

Description of Processes

Figure 4:
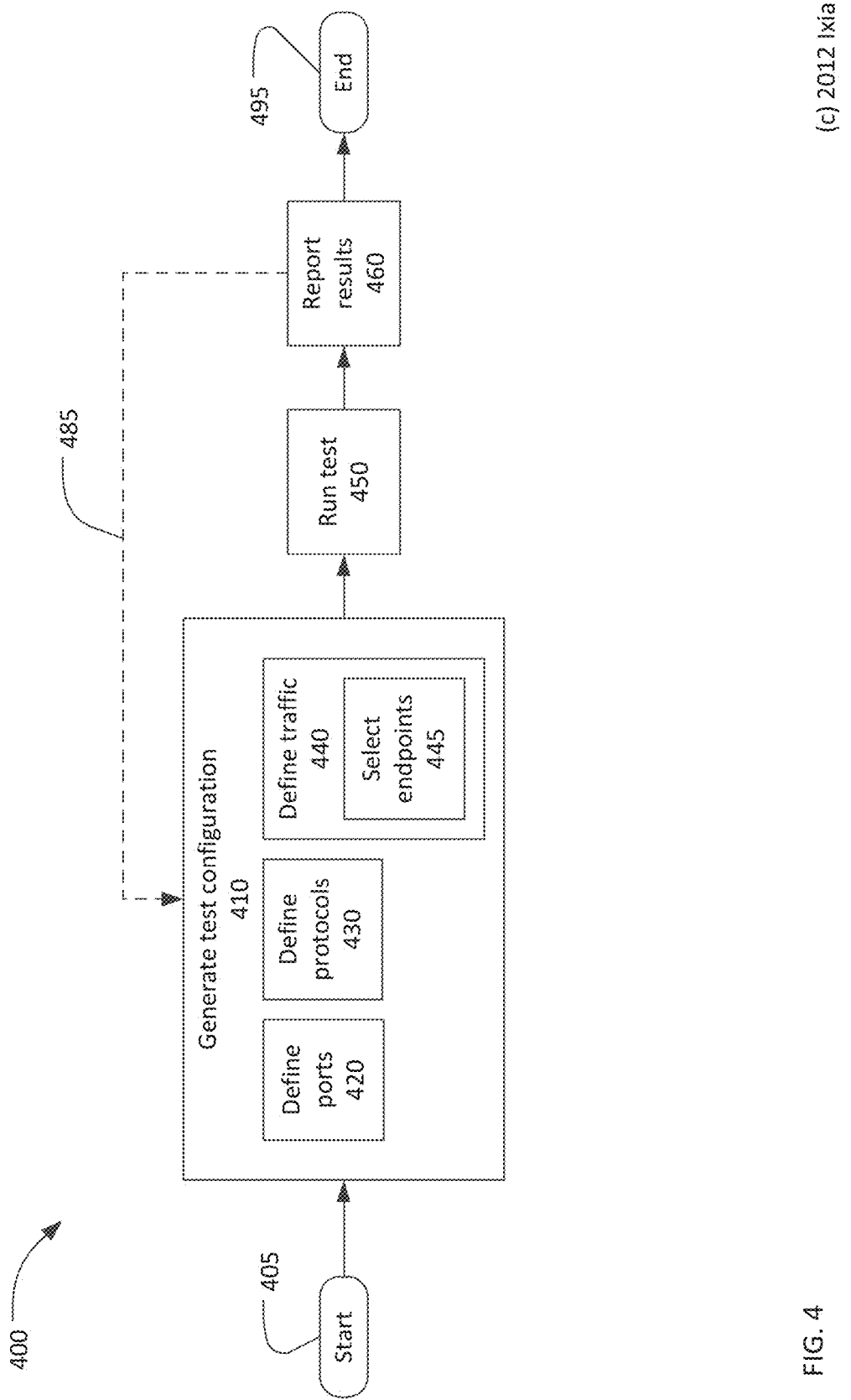
FIG. 4 is a flow chart of a process for testing a NUT.

Referring now to FIG. 4, a process 400 for testing a NUT may start at 405 and finish at 495. The process 400 may be executed within a test environment such as that shown in FIG. 1. The process 400 may be performed using a test administrator, such as the test administrator 210, in conjunction with a plurality of port units, such as the port unit 220. The process 400 may be used to test a network such as the network 190 and/or a network device such as the network device 192.

The process 400 may include generating a test configuration at 410, running a test session according to the test configuration at 450, and reporting test results at 460. For ease of description, these actions are shown to be sequential in FIG. 4. However, these actions may be performed, to at least some extent, concurrently. For example, interim test results may be reported at 460 while a test session is still running at 450. Further, the process 400 may be, to at least some extent, cyclic. For example, interim test results reported at 460 may be used to modify the test configuration, either automatically or as a result of some user action, as indicated by dashed line 485.

In this patent, the term "automatically" means "without user participation". A function performed automatically may be performed by hardware or by a combination of hardware, firmware, and/or software. For example, a function performed automatically may be performed by a computing device executing software instructions.

Generating a test configuration at 410 may include, at 420, defining a plurality of ports to be used to test the NUT. Each port may be defined by a set of port attributes describing the hardware and physical layer configuration of the port. Port attributes may include, for each port, identification of the hardware used to implement the port, the physical layer protocol implemented by the port, parameters to be used by the port, and other data. For example, the hardware may be identified by a model or part number of a line card and a chassis. The physical layer protocol may be an Ethernet protocol, ATM (asynchronous transfer mode, PoS (packet over Synchronous Optical Networking/Synchronous Digital Hierarchy), Fibre Channel, or some other physical layer protocol. Parameters included in the port attributes may include, for example, a physical layer address for the port, a data rate or interface type, a selection of a cyclic redundancy code (e.g. 16-bit or 32-bit), and parameters defining whether or not optional features (e.g. flow control, data scrambling, auto negotiation of data rates, etc.) are enabled.

A port unit, such as the port unit 220, may include hardware and software for 50 or more different protocols for data communications, security, network control, and routing. Depending on the nature of the tests to be performed during a test session, each port may typically use only a portion of the total number of protocols within its capability. Generating a test configuration at 410 may include, at 430, defining a layer 2/3 protocol suite which is a subset of the available protocols that will be active at each port. Defining the layer 2/3 protocol suite may include identifying layer 2 and layer 3 protocols to be usable at each port and defining all protocol attributes to be used by the ports. The term "protocol attributes" includes all parameters and data necessary for the use of the identified protocols. Many, but not all, protocols require one or more attribute to be defined.

A common example of a protocol attribute is an IPv4 or IPv6 address which may be assigned at 430. During a test session, a port unit may emulate a single device, such as a server, or a plurality of virtual devices connected to the network under test. For example, a single port may emulate a bridge to another network, such as a local area network linking a large number of client computers. A single port may also emulate a switch or router that connects to a large number of other devices. Thus, at 430, each port may be assigned a unique address for each of one or more virtual devices to be emulated by the port during the test session.

When a port is connected to a network under test, the port must announce it s presence to the network and describe what device or devices may be accessed via the port. Thus defining protocols at 430 may also include selecting one or more routing protocol, such as OPSF (open shortest path first protocol) or BGP (border gateway protocol) to be used by the port to describe itself to the network under test. Further, defining protocols at 430 may also include structuring the information that the port will provide to the network using the selected routing protocol(s). This information may include, for example, a list or other description of the device addresses that can be accessed via the port.

Generating a test configuration at 410 may also include, at 440, defining the traffic to be generated by the ports while testing the NUT. The test traffic and the data used to define the test traffic may depend on the type of network or device to be tested. For example, when a NUT is a switch or router operating at layer 2 or layer 3 of the network structure, the test traffic may include a large plurality of IP packets apparently originating from a plurality of source devices emulated by ports external to the NUT and destined for a plurality of destination devices emulated by ports external to the NUT. The ports may collect traffic statistics such as the latency time required to transmit a packet via the NUT, the number of packets lost during transit through the NUT and the number of packets reordered during transit through the NUT. In this case, source and destination devices or endpoints for the traffic may be defined at 445.

When a NUT operates at a higher layer of the network structure (for example, a server, a server load balancer, a network security device that performs packet inspection, and other network devices), the test traffic may include or be a plurality of simulated TCP connections or simulated application-layer transactions. In this case, the test traffic may be defined at 440 in terms of TCP connections, application layer transaction (e.g. HTTP Put and Get transactions), or emulated user activities. The source of such traffic may be ports external to the NUT and the destinations for the traffic may be within the NUT. Source endpoints for such traffic may also be selected at 445 as part of defining traffic at 440.

Figure 5:
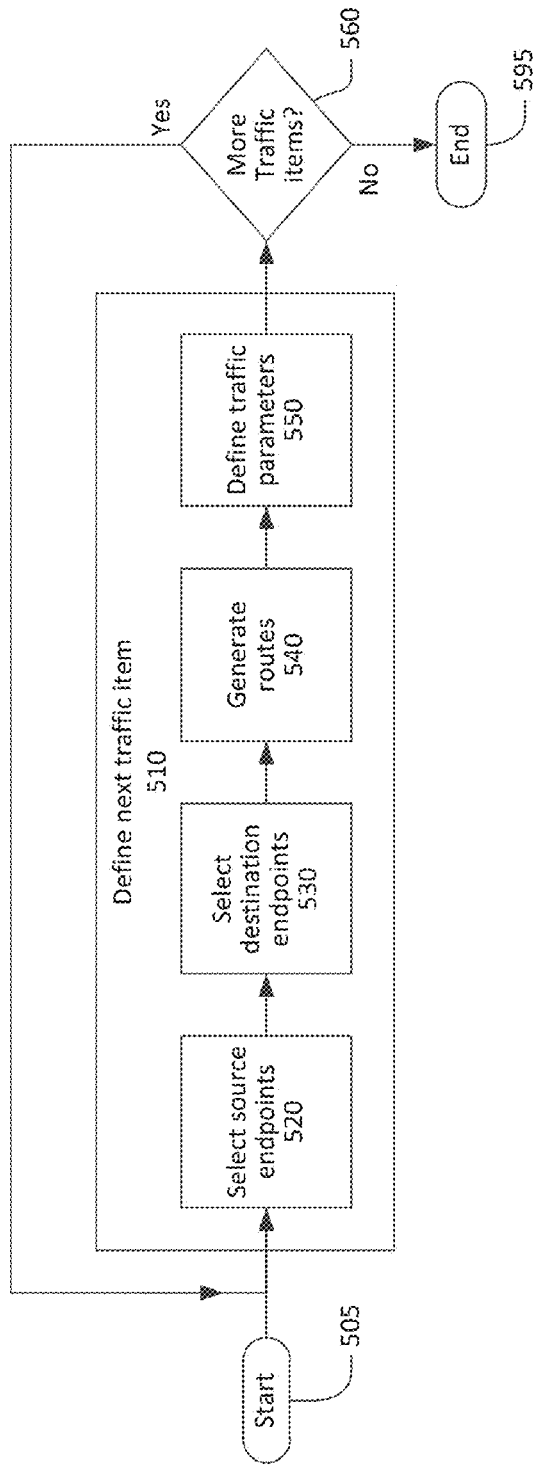
FIG. 5 is a flow chart of a process for defining traffic for a test configuration.

Referring now to FIG. 5, a process 500 for defining traffic in a test configuration may be suitable for use at 440 in the process 400. The process 500 may start at 505 after the ports and protocols to be used in a test session have been defined. The process 500 may end at 595 after all traffic items for the test configuration have been defined, which is to say all of the traffic to be generated during a test session has been defined. Once finished, the process 500 may be repeated in whole or in part if changes are made to the port definitions in the course of defining a test configuration. The process 500 may be cyclic, to some extent, and the actions from 510 to 580 may be repeated multiple times as needed to define all of the traffic items for the test configuration.

At 510, a traffic item may be defined. In this patent, a "traffic item" is network traffic between an identified plurality of source endpoints and an indentified plurality of destination endpoints. A traffic item may include a large number of packets of different types, lengths, rates, and other characteristics. Generally, each identified source endpoint will originate a portion of the traffic and each identified destination endpoint will receive a portion of the traffic. Each source endpoint may send traffic to some or all of the destination endpoints and each destination endpoint may receive traffic from some or all of the source endpoints. Defining a traffic item at 510 may include selecting source endpoints at 520, selecting destination endpoints at 530, generating routes at 540, and defining traffic parameters at 550.

Source and destination endpoints select at 520 and 530, respectively, may be virtual device emulated by ports. For purposes of selection, endpoints may be organized in a tree structure similar to a hierarchical file structure used by computer operating systems. In a tree structure, each port in a test configuration is analogous to a file folder and each virtual device is analogous to a file.

Figure 6:
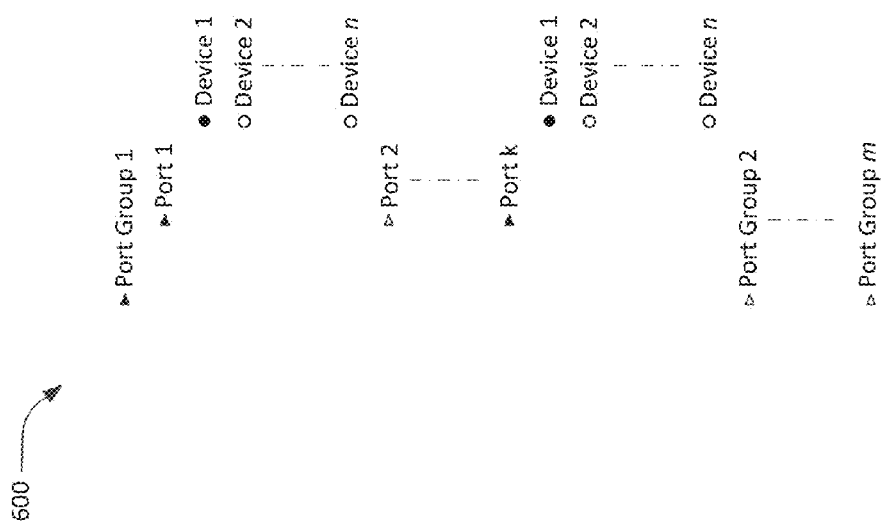
FIG. 6 is an exemplary tree structure for organizing endpoints.

An exemplary tree structure is shown in FIG. 6. In this example, a hierarchical tree 600 includes m port groups, identified as Port Group 1 to Port Group m. Each port group may contain one or more ports. Each port group may include, for example, ports having different capability, ports that will be used to test different characteristics of a network, or ports that are distinguished or organized in some other manner. A open triangle next to a port or port group name indicates that the port or port group may be opened to view another layer of the hierarchy. A filled triangle next to a name indicates that the port or port group is opened and may be closed. An open button next to a device name indicates that the port has not been selected as an end point and a closed button indicates that the device has been selected.

In this example, port group 1 has been opened. The ports within port group 1 are displayed and assigned consecutive numbers from 1 to k. Similarly, ports 1 and k have been opened. The devices emulated by ports 1 and k are displayed and assigned consecutive numbers from 1 to n. Consecutive numbers may be assigned to ports and devices for the convenience of the user defining endpoints for network traffic. The assigned numbers may simply represent a count of the ports and devices available at the selected level of the hierarchical tree. The numbers assigned to ports and devices may be unrelated to any physical or logical identifier (e.g. serial number, MAC address, IP address, etc.) that may also be assigned to the ports and devices. The same ports and devices may be assigned different numbers during other steps of generating a test configuration.

The three-level hierarchical tree 600 is exemplary, and more than three hierarchical layers may be used in a test configuration. Layers may receive different names (e.g. "endpoint" in lieu of "device" or "protocol" in lieu of "port group"). One or more hierarchical layers may exist between the lowest layer (device or endpoint) and the port layer. At each layer, branches extending from a common trunk may be consecutively numbered for convenience.

Selecting ports from a hierarchical tree may be accomplished by displaying the tree structure such that a user may open ports and port groups (folders) and select individual devices. However, a complex network test configuration may include hundreds of ports with thousands of devices per port. In such a test configuration, selecting endpoints by opening each port and selecting devices individually or in groups can be very time-consuming.

Figure 7:
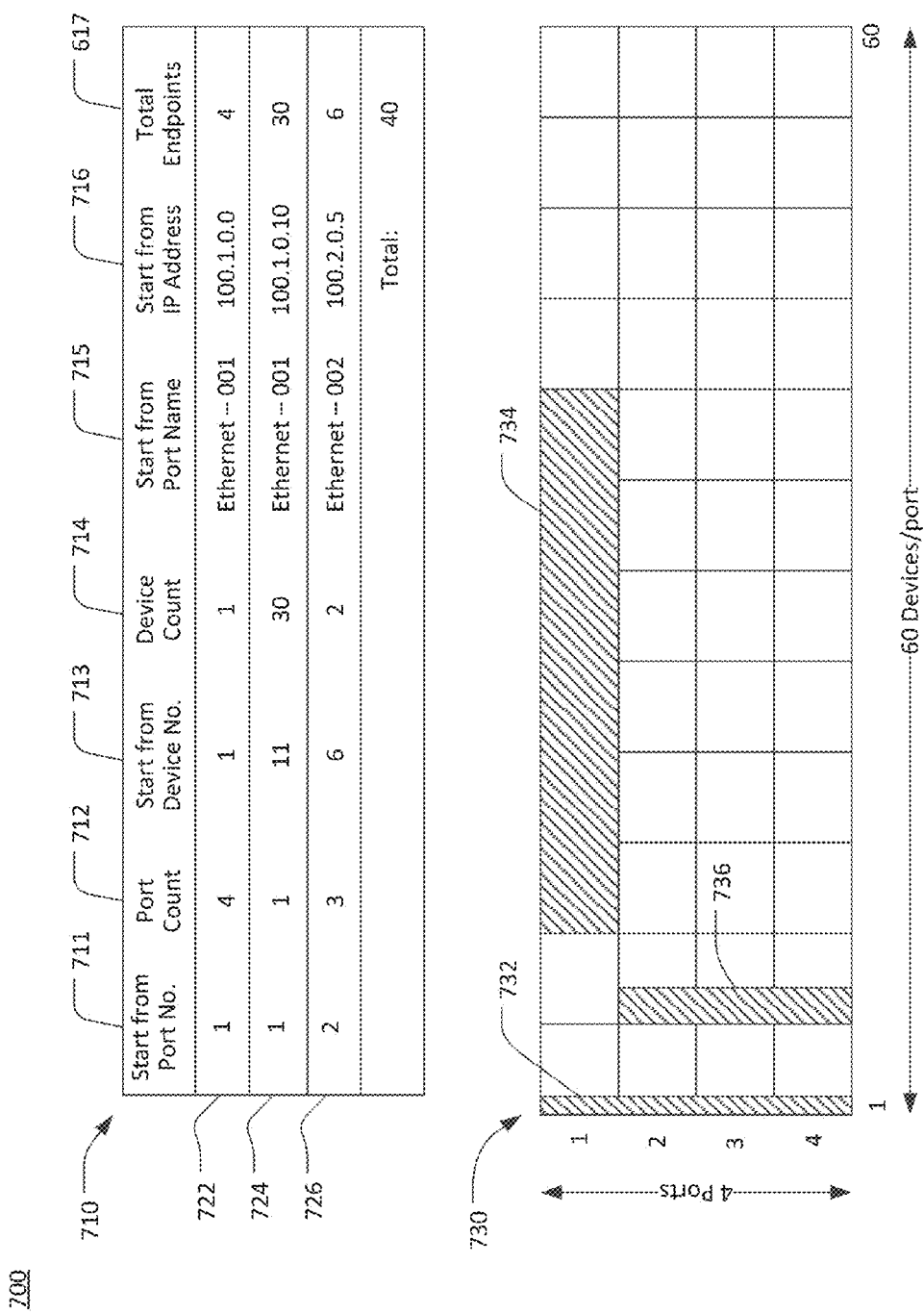
FIG. 7 is a representation of a graphical user interface for selecting source or destination endpoints for a test configuration.

FIG. 7 shows an example of an improved graphical user interface display screen 700 for selecting endpoints. The display screen 700 replaces the two lowest levels of a hierarchical tree, as shown in FIG. 6, with a tabular list 710 of selected endpoints and a graphical representation 730 of selectable endpoints for a selected Port Group. In this example, the tabular list 710 includes columns for a "start from port number" 711, a port count 712, a "start from device number" 713, and a device count 714. Entries in these columns may be made or edited by the user. As in the example of FIG. 6, ports are numbered consecutively starting with one and that the virtual devices on each port are also numbered consecutively starting with one. The assigned numbers may simply represent a count of the ports and devices available at the selected level of the hierarchical tree.

The tabular list 710 also includes columns for a start from port name 715, a start from IP address 716 and a total number of endpoints 717. These entries may be determined by the test system automatically based on user entries in the first four columns of the tabular list 710.

The graphical representation 730 may be, as shown in this example, a rectangular matrix where the rows of the matrix represent ports and the column of the matrix represent devices. The exemplary graphical representation 730 includes four rows corresponding to four ports and 60 columns corresponding to 60 virtual devices per port. A test system may contain more or fewer than four ports and more or fewer than 60 device per port. Each point or intersection of a row and column represents a unique selectable endpoint.

In this example, the tabular list 710 describes three groups of selected endpoints. A first group of selected endpoints, described in row 722, starts from port 1, device 1, and includes four ports and one device per port. In other words, the first group consists of the first device on each of the four ports. The first group may be identified on the graphical representation 730 by an area 732 that may be highlighted, colored, or otherwise distinguished.

A second group of selected endpoints is described in row 724 of the tabular list 710. The second group of selected endpoints starts with port 1, device 11, and includes only one port (i.e. port 1) and 30 devices (i.e. devices 11-40). The second group may be identified on the graphical representation 730 by an area 734 that may be highlighted, colored, or otherwise distinguished. A third group of selected endpoints is described in row 726 of the tabular list 710. The second group of selected endpoints starts with port 2, device 6 and includes three ports (i.e. ports 2-4) and 2 devices (i.e. devices 5-6). The third group may be identified on the graphical representation 730 by an area 736 that may be highlighted, colored, or otherwise distinguished.

Figure 8:
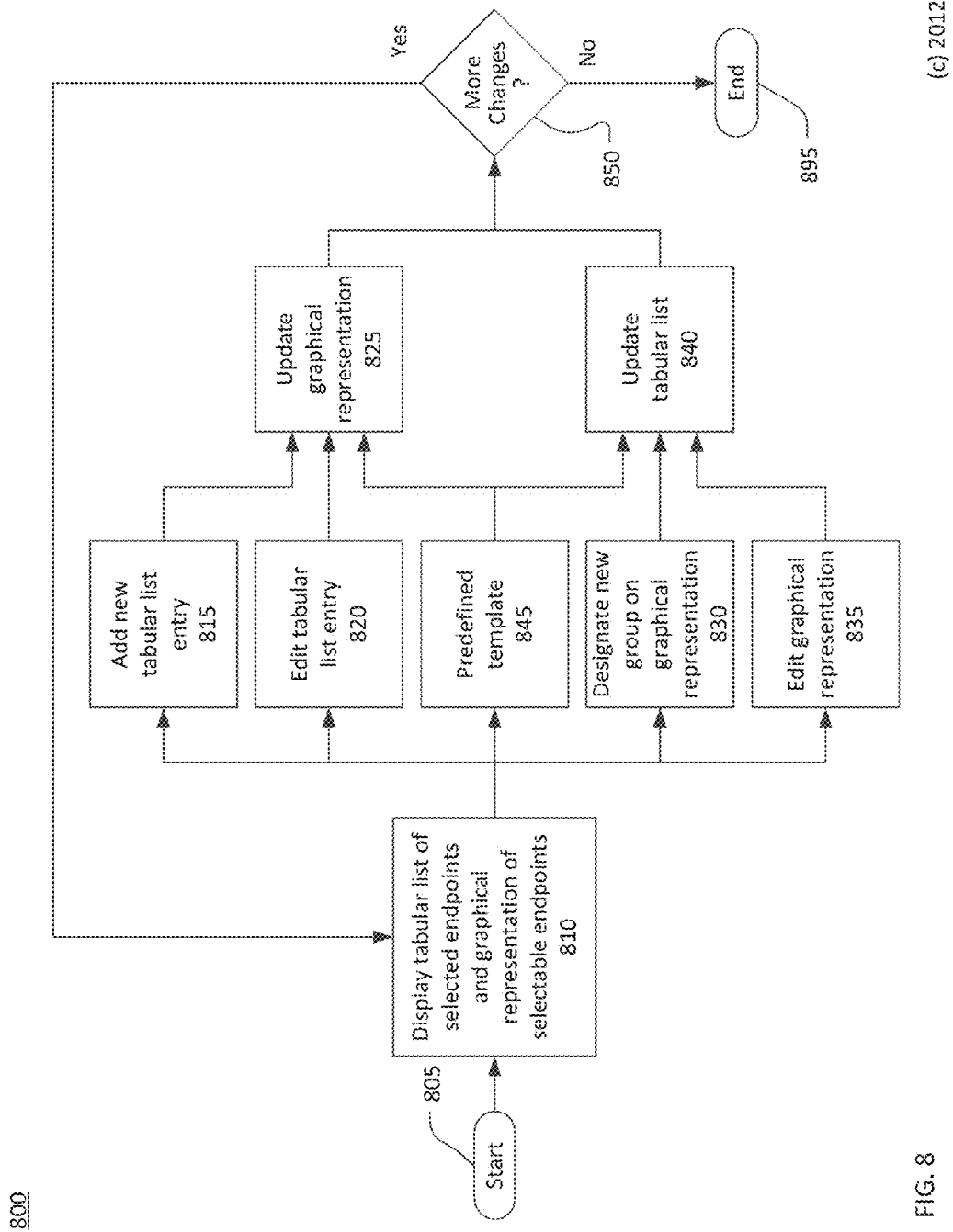
FIG. 8 is a flow chart of a process for selecting source or destination endpoints for a test configuration.

Referring now to FIG. 8, a process 800 for selecting endpoints may be used at 520 and/or 530 in the process 500 for selecting source endpoints and destination endpoints, respectively. The process 800 may start at 805 each time a group of endpoints are selected for a traffic item. The process 800 may be cyclic in nature, and the actions from 810 to 850 may be repeated until all desired endpoints have been selected.

At 810, a tabular list of selected endpoints, such as the exemplary tabular list 710, may be displayed to a test engineer or other user responsible for selecting endpoints. The tabular list may be displayed, for example, as part of a graphical user interface on a display included in the user interface 215 coupled to the test administrator 210. The tabular list may describe selected endpoints, for example, in terms of port numbers and device numbers. The displayed tabular list may be blank (i.e. only column headings may be displayed) until some endpoints are actually selected.

At 810, a graphical representation of selectable endpoints, such as the graphical representation 730, may also be displayed. The graphical representation of selectable endpoints may be in the form of a two dimensional chart or graph, where a first axis represents port numbers and a second axis represents device numbers and each point in the graph corresponds to a unique endpoint. Once endpoints are selected, the selected endpoints may be identified on the graphical representation by a color change, highlighting, outlining, or some other method.

Actions 815 to 835 are alternative ways to modify the selection of endpoints displayed at 810. At 815, a new entry or row may be added to the tabular list of selected endpoints. For example, a user may enter a start from port number, a number of ports, a start from device number, and a number of devices to define a new group of endpoints. Alternatively, at 820, the user may edit or modify a previously-selected group of endpoints. In this case, the user may change one or more of the from port number, the number of ports, the start from device number, and the number of devices for an existing group of selected endpoints. Each time a new entry is added to the tabular list at 815 or an existing entry is modified at 820, the graphical representation of selectable endpoints may be updated at 825 to reflect the changes to the tabular list of selected end points.

Endpoints may also be selected by using a pointing device to effect changes to the graphical representation of selectable endpoints. At 830, a user may designate a new group of selected endpoints, for example by clicking and dragging a mouse or other pointing device over a portion of the graphical representation. Alternatively, at 835, a user may use the mouse or other pointing device to edit an existing group of endpoints, for example by "grabbing" and dragging an edge of an existing group. Each time a new group of endpoint is selected at 830 or an existing group is modified at 835, the tabular list of selected endpoints may be updated at 840 to reflect the changes.

Endpoints may also be selected by selecting a predefined template at 845. Example predefined templates may include "first device on each port", "first half of devices on selected port(s)", and "second half of devices on selected port(s)". Other predefined templates may be created and saved for later use by a user and/or administrator of the test system. These predefined templates may, in whole or in part, be based upon or drawn to a particular network topography being tested by the user and/or administrator. When a predefined template is selected at 845, both the tabular list of selected endpoints and the graphical representation of selectable endpoints may be updated accordingly at 825 and 840, respectively.

At 850 a determination may be made whether or not additional changes will be made to the selected endpoints. This determination may be made, for example, by a user input via the graphic user interface. When additional changes to the selected endpoints will be made, the process 800 may return to 810 to await another user action. When further changes are not required, the process 800 may end at 895.

All of the endpoints for a traffic item do not necessarily have to be selected using the process 800. In some circumstances, a user may select (or may have already selected in the case of a legacy test configuration being updated or reused) some endpoints from a hierarchical tree structure as shown in FIG. 6 and may select other endpoints using the process 600.

Referring back to FIG. 5, after source endpoints and destination endpoints have been selected at 520 and 530, respectively, routes between the selected endpoints may be generated at 540. Routes generated at 540 may include unicast routes between a source endpoint and a single destination endpoint, and multicast routes between a source endpoint and two or more destination endpoints.

Routes may be generated automatically at 540 in accordance with a routing rule selected by the user from a plurality of alternative routing rules. For example, a routing rule may define routes by simultaneously sequencing through the available source and destination endpoints. Assuming a traffic item has three source ports (A, B, C) and five destination ports (1, 2, 3, 4, 5), the use of the sequential routing rule would result in generation of routes A-1, B-2, C-3, A-4, and B-5. For further example, a routing rule may generate all possible routes between the selected source and destination endpoints. Again assuming a traffic item has three source ports (A, B, C) and five destination ports (1, 2, 3, 4, 5), the use of the "all possible" routing rule would result in generation of 15 routes including all possible combinations of source and destination endpoints. For further example, a "random selection rule" may generate a randomly selected subset of the possible routes between the source and destination endpoints. Again assuming a traffic item has three source ports (A, B, C) and five destination ports (1, 2, 3, 4, 5), the use of the "random selection" routing rule to generate ten routes could result in generation of routes A-1, A-2, A-3, A-5, B-2, B-4, B-5, C-1, C-2, C-5 or routes A-2, A-3, A-5, B-1, B-3, B-4, B-5, C-1, C-3, C-4.

Routing rules for multicast packets may be more complex. For example, a routing rule may sequence through the selected source endpoints and link each source endpoint with a plurality of randomly-selected endpoints.

After routes have been generated at 540, traffic parameters may be defined at 550. In this context, "traffic parameters" means all data necessary to generate the desired traffic during a test session. Traffic parameters include data defining packet types, packet lengths, transmission rates, packet content, and other information. For example, at 550, traffic parameters may be entered or selected by the user via a graphical user interface. Traffic parameters may be directly entered by the user (e.g. as numerical data), may be selected by the user from predetermined options (e.g. pull down lists), may be selected by user using graphical devices such as virtual knobs or sliders, or may be defined in some other manner.

After all traffic parameters have been defined for a traffic item at 550, a determination may be made at 560 whether or not additional traffic items will be defined for the test configuration. When additional traffic items are required, the process 500 may repeat from 520. When no additional traffic items are required, the process 500 may end at 595.

Although shown in FIG. 5 as a sequence of actions for ease of description, the process 500 may be iterative. A user may return to any action in the process from any subsequent action, and may perform the actions shown in FIG. 5 in different order. For example, a user may selected source and destination endpoints, generate routes, and define traffic parameters for a portion of a traffic item and then return to select other endpoints for additional routes and/or different traffic parameters.

Figure 9B:
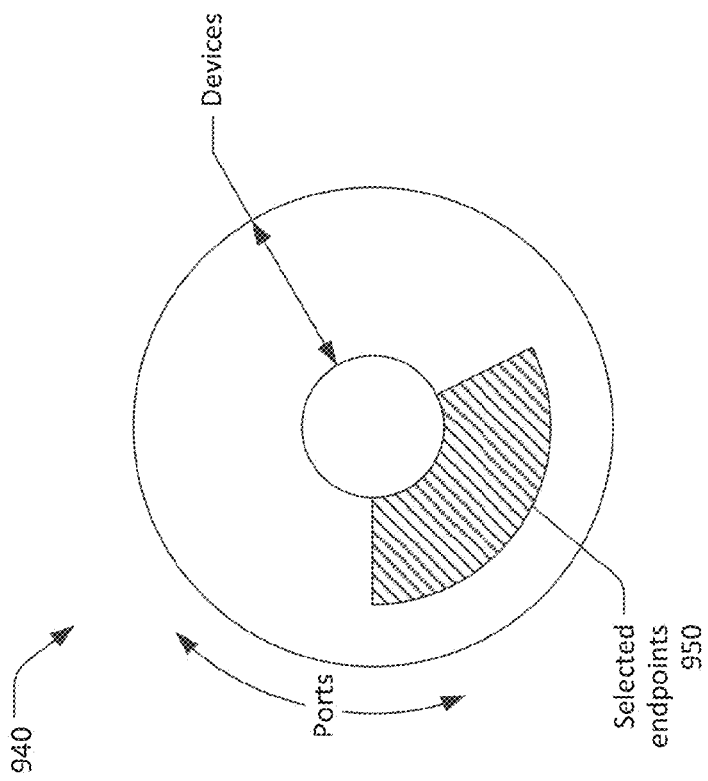
FIG. 9B is a graphical representation of selectable endpoints.
Figure 9A:
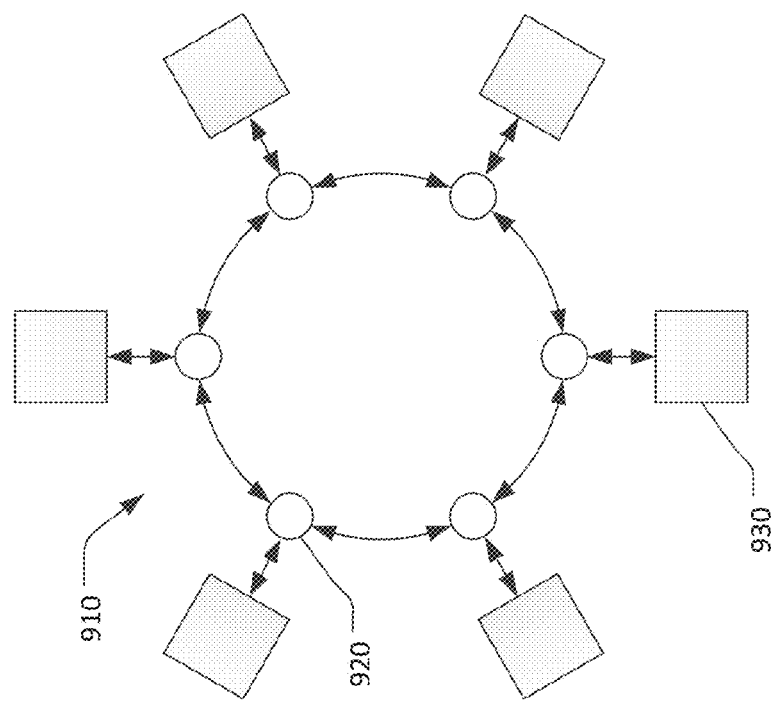
FIG. 9A is a block diagram of another network environment.

In the example of FIG. 7, the graphical representation 730 was shown as a rectangular matrix, where the rows of the matrix represent ports and the columns of the matrix represent virtual devices. A graphic representation of selectable endpoints need not necessarily be a rectangular matrix. A graphical representation may have some other shape that may better represent the test configuration to a user selecting endpoints. Referring now to FIG. 9A, an exemplary network 910 may include a plurality of nodes 920 connected generally as a ring. Each node may be connected to a respective port 930 of a test system. Each port 930 may emulated a plurality of virtual devices. In this situation, a graphical representation 940 of selectable endpoints may be based on a polar coordinate system, as shown in FIG. 9B, where a radial axis represents virtual devices and a rotational axis represents ports. In this case, a group of selected endpoints 950 has the form of a wedge-shaped portion of the graphical representation 940.

Figure 10:
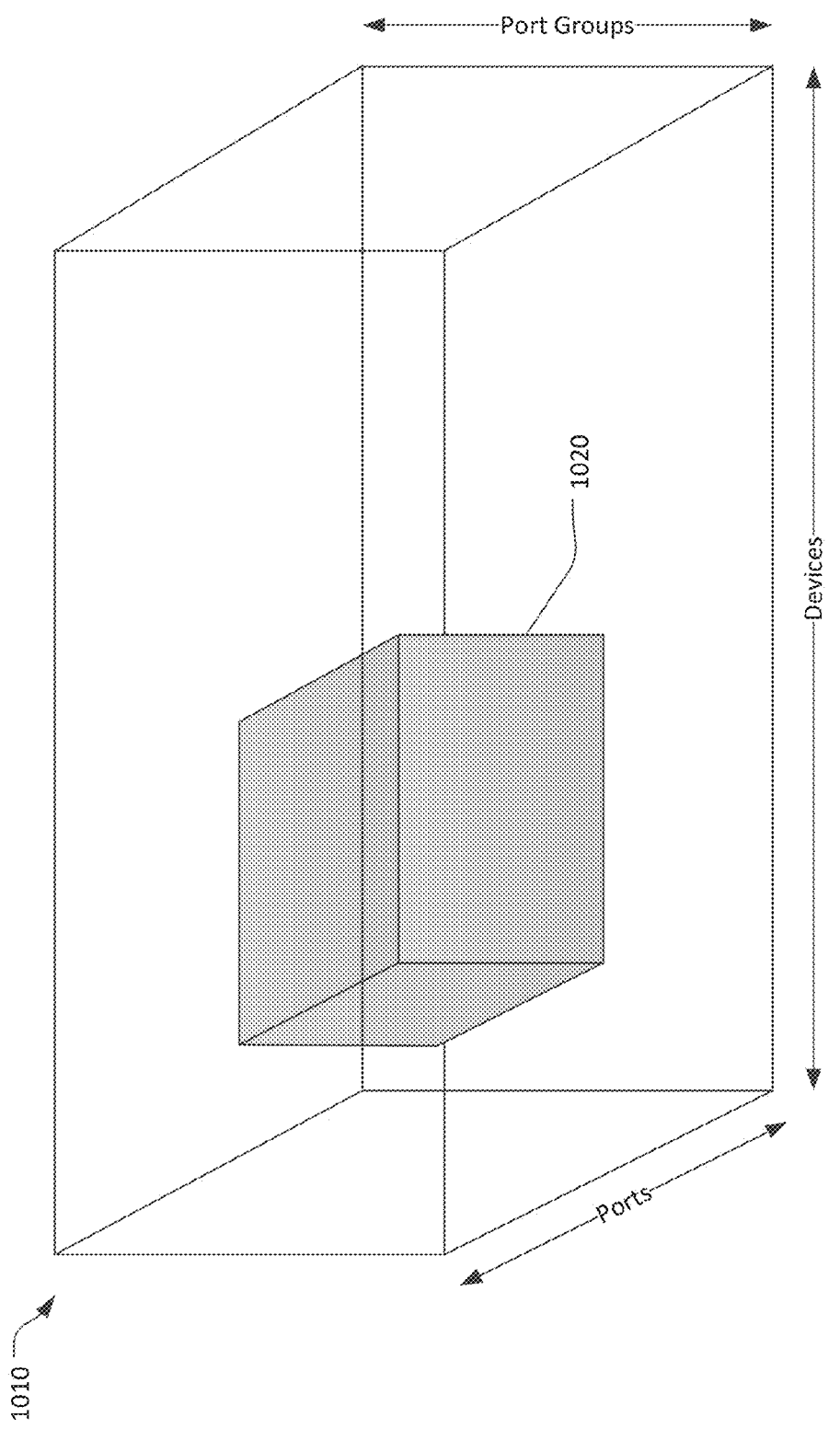
FIG. 10 is a graphical representation of selectable endpoints.

The graphical representations of end points 730 and 940, in FIG. 7 and FIG. 9 respectively, represented two-dimensional spaces in which a first axis represents ports and a second axis represents devices. A graphical representation of end points is not limited to two dimensions. For example, the three lowest layers of a hierarchical structure may be represented by a three-dimensional space. FIG. 10 shows a graphical representation 1010 of end points in a three-dimensional space. Continuing the example of FIG. 6, a first axis may represent port groups, a second axis may represent ports within each port group, and a third axis may represent devices. Other test configurations may use a different hierarchical structure and/or different names for the layers of heirarchy. A block of selected endpoints may appear as a three-dimensional object 1020. Techniques for displaying two-dimensional representations of three-dimensional objects or spaces on conventional display devices are commonly known. The three-dimensional graphical representation 1010 may be displayed in conjunction with a tabular list of selected endpoints similar to the list 710 with the addition of columns for "start from port group" and "port group count".

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for testing a network, comprising:
    displaying a graphical user interface including a graphical representation of endpoints available for selection as endpoints of traffic to be generated during a test session and a tabular list describing selected endpoints;
    selecting source endpoints for the traffic, selected source endpoints designated on the graphical representation of endpoints and described in the tabular list;
    selecting destination endpoints for the traffic, selected destination endpoints designated on the graphical representation of endpoints and described in the tabular list; and
    generating traffic from the selected source endpoints for transmission to the selected destination endpoints via the network.

2. The method of claim 1, wherein selecting source endpoints comprises a user selecting a predefined template identifying a plurality of endpoints.

3. The method of claim 1, wherein selecting source endpoints comprises one of a user adding an entry to the tabular list and a user editing an existing entry in the tabular list.

4. The method of claim 3, wherein each entry in the tabular list includes a start port number, a port count, a start device number, and a device count.

5. The method of claim 3, wherein user entries in the tabular list are automatically reflected in the graphical representation of endpoints.

6. The method of claim 1, wherein the graphical representation of endpoints comprises a graph, wherein
    a first axis of the graph represents ports,
    a second axis of the graph represents devices, and
    each point on the graph represents a specific device emulated by a specific port.

7. The method of claim 6, wherein
    the graph is a two-dimensional rectangular matrix,
    rows of the matrix represent respective ports, and
    columns of the matrix represent devices.

8. The method of claim 6, wherein
    the graph is based on a polar coordinate system,
    an azimuth axis of the graph represents ports, and
    a radial axis of the graph represents devices.

9. The method of claim 6, wherein
    the graph is a two-dimensional representation of a three-dimensional space, and
    a third axis of the graph represents groups of ports.

10. The method of claim 6, wherein selecting source endpoints comprises one of a user designating an area of the graph and a user modifying a previously-designated area of the graph, whereby all points within the designated area are selected as endpoints.

11. The method of claim 10, wherein designating and modifying are performed using a pointing device.

12. The method of claim 10, wherein designated or modified areas of the graph are automatically reflected in the tabular listing of selected endpoints.

13. A test manager for a network test system, comprising:
a non-transitory machine readable storage medium storing instructions that, when executed, cause a computing device to perform a method for testing a network, the method comprising:
displaying a graphical user interface including a graphical representation of endpoints available for selection as endpoints of traffic to be generated during a test session and a tabular list describing selected endpoints;
selecting source endpoints for the traffic, selected source endpoints designated on the graphical representation of endpoints and described in the tabular list;
selecting destination endpoints for the traffic, selected destination endpoints designated on the graphical representation of endpoints and described in the tabular list; and
generating traffic forming data to cause a plurality of port units to generate traffic from the selected source endpoints for transmission to the selected destination endpoints via the network.

14. The test manager of claim 13, wherein selecting source endpoints comprises a user selecting a predefined template identifying a plurality of endpoints.

15. The test manager of claim 13, wherein selecting source endpoints comprises one of a user adding an entry to the tabular list and a user editing an existing entry in the tabular list.

16. The test manager of claim 15, wherein each entry in the tabular list includes a start port number, a port count, a start device number, and a device count.

17. The test manager of claim 15, wherein user entries in the tabular list are automatically reflected in the graphical representation of endpoints.

18. The test manager of claim 13, wherein the graphical representation of endpoints comprises a graph, wherein
a first axis of the graph represents ports,
a second axis of the graph represents devices, and
each point on the graph represents a specific device emulated by a specific port.

19. The test manager of claim 18, wherein
the graph is a two-dimensional rectangular matrix,
rows of the matrix represent respective ports, and
columns of the matrix represent devices.

20. The test manager of claim 18, wherein
the graph is based on a polar coordinate system,
an azimuth axis of the graph represents respective ports, and
a radial axis of the graph represents devices.

21. The test manager of claim 18, wherein
the graph is a two-dimensional representation of a three-dimensional space, and
a third axis of the graph represents groups of ports.

22. The test manager of claim 18, wherein selecting source endpoints comprises one of a user designating an area of the graph and a user modifying a previously-designated area of the graph, whereby all points within the designated area are selected as endpoints.

23. The test manager of claim 22, wherein designating and modifying are performed using a pointing device.

24. The test manager of claim 22, wherein designated or modified areas of the graph are automatically reflected in the tabular listing of selected endpoints.

25. The test manager of claim 13, further comprising:
a storage device comprising the non-transitory machine readable storage medium;
a processor and memory coupled to the storage device and configured to execute the stored instructions.

* * * * *